Jan. 17, 1956  D. O. BENSON  2,731,007
GASOLINE MOTOR STARTING DEVICE
Filed Jan. 22, 1953
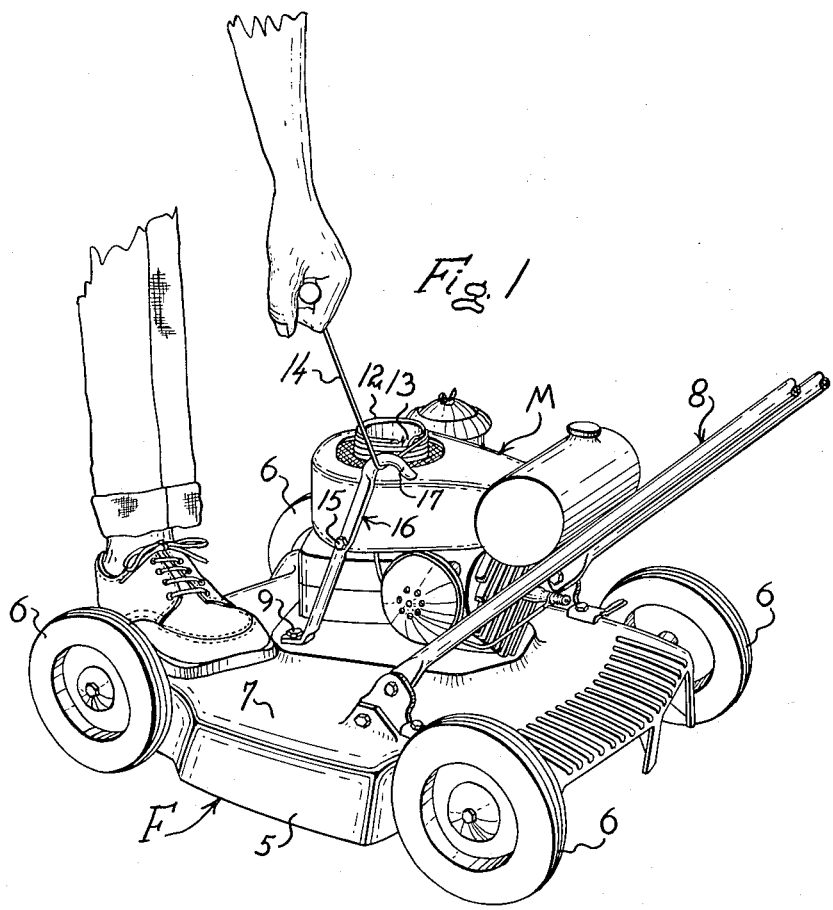
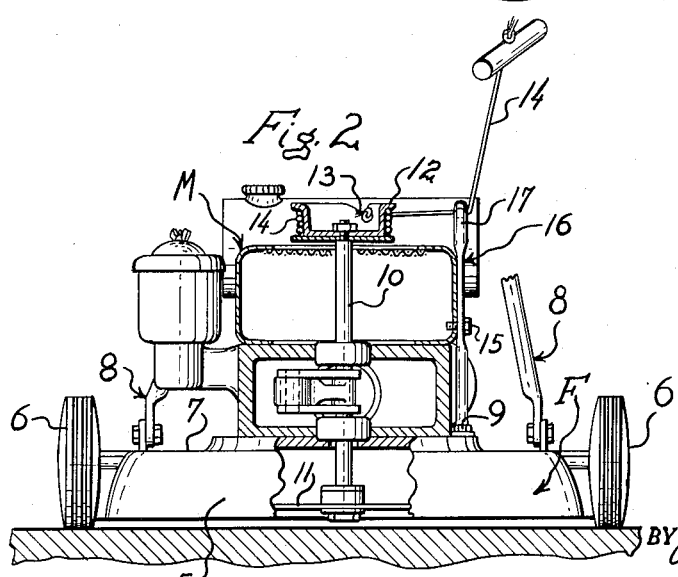
INVENTOR.
Don O. Benson
BY Williamson, Williamson
Schroeder & Adams
ATTORNEYS United States Patent Office 2,731,007
Patented Jan. 17, 1956

2,731,007

GASOLINE MOTOR STARTING DEVICE

Don O. Benson, Minneapolis, Minn., assignor to Toro Manufacturing Corporation of Minnesota, Minneapolis, Minn., a corporation of Minnesota Application January 22, 1953, Serial No. 332,616

4 Claims. (Cl. 123—185)

This invention relates to lawn mowers. More particularly, it relates to lawn mowers of the gasoline motor-driven hand-guided type.

It is a general object of my invention to provide a gasoline motor-driven hand-guided type of lawn mower having means for facilitating the starting of the motor.

A more specific object is to provide a lawn mower of the gasoline motor-driven hand-guided type which can be quickly and easily started by the operator from a convenient position.

Another object is to provide a lawn mower of the type described, the motor of which can be more easily started by the operator, this starting operation being accomplished while the operator is standing substantially erect.

Another object is to provide a lawn mower of the type having its cutting elements rotating rapidly about a vertical shaft and driven by a gasoline motor which has means for facilitating the starting of the motor by the operator while in a position which is more convenient and comfortable and which lends itself to more easily anchoring the mower against the pull of the starting line.

These and other objects and advantages of my invention will more fully appear from the following description made in connection with the accompanying drawings, wherein like reference characters refer to the same or similar parts throughout the several views, and in which:

Fig. 1 is a perspective view of one embodiment of my invention with the starting operation being illustrated therein; and Fig. 2 is a front end elevational view of the same mower with portions thereof broken away to show the vertical drive shaft of the motor.

One embodiment of my invention may include, as shown in Figs. 1 and 2, a low ambulant frame indicated generally as F, this frame including a downwardly opening housing 5 which is supported at a low level above the ground by a plurality of wheels 6 which are rotatably mounted in the peripheral portions of the housing at its 4 corners. This housing 5 has a substantially flat upper surface 7 and has handle structure indicated generally as 8 secured thereto and extending upwardly and rearwardly therefrom.

Secured to the upper surface 7 of the housing 5 and extending upwardly therefrom is a gasoline internal combustion type motor indicated generally as M. This motor M is secured to the housing by anchor bolts such as 9 and is provided with a vertically extending drive shaft 10. As best shown in Fig. 2, this drive shaft extends downwardly through the housing 5 and terminates within the confines of the housing a short distance above the ground. It carries a cutter bar 11 which has blade elements thereupon (not shown) for the purpose of cutting the grass while travelling at high speed with the drive shaft 10.

The upper end portion of the drive shaft 10 has fixedly secured thereto a starting pulley or starter drum 12 which rotates with the drive shaft 10 about a vertical axis. This starter drum 12 is fixedly secured to the shaft 10 in driving relation and has a notch 13 formed in the upper edge thereof to receive a knot on the inner end of a starter rope or line 14. The motor M can be readily started by winding the starter line 14 around the starter drum 12 after the knotted end has been secured in the notch 13. A sharp pull upon the free end of the starter line 14 tangential to the drum 12 will cause the drum to rotate and drive the drive shaft 10 sufficiently rapidly to start the motor.

Mounted upon the side of the motor by means of the anchor bolt 9 and a second bolt 15 is a hook member indicated generally as 16. As best shown in Fig. 1, this hook member opens downwardly and extends rearwardly relative to the motor M. The hook is of generous radius as can best be seen in Fig. 1 and has a smooth concave surface 17 which engages the starter line 14 in the manner shown in Fig. 1.

In use, the knotted end of the starter line 14 is engaged in the notch 13 and a substantial portion of the line is thereafter wound around the starter drum 12 in the manner shown in Fig. 1. The operator then places his foot upon the upper surface of the housing 5, as shown in Fig. 1, to anchor the motor relative to the line of pull and passes the starter line 14 beneath the hook member 16 and then pulls upwardly with a quick movement. It can be readily seen that the operator can stand substantially erect while doing this and that it is much more convenient for him to perform the starting operation in this manner. Such a quick movement of course will cause the starting line to rotate the drum 12 and start the motor in the manner described.

Thus it can be readily seen that I have provided a lawn mower of the gasoline motor power-driven type which can be started in a much more convenient manner and the starting operation of which can be much more easily accomplished. The starting operation can be accomplished while the operator stands relatively erect and at the same time is able to conveniently and with little effort anchor the frame F and the motor M against the sharp upward pull exerted by the operator upon the starting line 14. It should be noted that without the hook member 16 the operator must necessarily get into an awkward position in order to rotate the drum 12 by means of the starter line 14 and that while in this position the starting position requires considerably more effort than in the more erect position. In addition such a position is potentially dangerous for if the sharp pull is sufficiently strong it may draw the lawn mower toward the operator and should the motor start simultaneously, serious injury may result to the operator from the rapidly rotating blades.

It will of course be understood that various changes may be made in the form, details, arrangement and proportions of the various parts without departing from the scope of my invention.

What is claimed is:

1. The combination of a low ambulant frame, a gasoline internal combustion motor mounted on said frame and having its drive shaft extending vertically, a starter drum fixedly mounted on one end portion of said shaft for rotation therewith, said starter drum having engagement means thereon adapted to engage one end of a starter line and being adapted to have such a starter line wound therearound for the purpose of imparting rotary movement thereto and thereby starting said motor, and a downwardly opening hook member mounted on said motor and positioned laterally of and on substantially the same level as said drum and extending substantially normal to a line drawn from said hook member tangential to said drum and being adapted to engage such a line when the latter is passed beneath the same and drawn upwardly whereby said motor may be relatively easily started by the operator by pulling upwardly on the free end of such line.

2. The combination of a gasoline internal combustion motor having its drive shaft extending vertically, a starter drum fixedly mounted on one end portion of said shaft for rotation therewith, said starter drum having engagement means thereon adapted to engage one end of a starter line and being adapted to have such a starter line wound therearound for the purpose of imparting rotary movement thereto in order to start said motor, and a downwardly opening hook member fixedly mounted on said motor and positioned laterally of and on substantially the same level as said drum and extending substantially normal to a line drawn from said hook member tangenial to said drum and being adapted to engage such a line when the latter is passed beneath the same and drawn upwardly whereby said motor may be relatively easily started by the operator by pulling upwardly on the free end of such line.

3. The combination of a gasoline internal combustion motor, a starter drum mounted on said motor for rotation about a vertical axis in driving relation to said motor, said starter drum having engagement means thereon adapted to engage one end of a starter line and being adapted to have such a starter line wound therearound for the purpose of imparting rotary movement thereto and thereby starting said motor, and a downwardly opening hook member fixedly mounted on said motor and positioned laterally of and on substantially the same level as said drum and extending substantially normal to a line drawn from said hook member tangential to said drum and being adapted to engage such a line when the latter is passed beneath the same and drawn upwardly whereby said motor may be relatively easily started by the operator by pulling upwardly on the free end of such line, said hook member having a generous radius and a fixed line engaging surface which is smooth and concavely shaped.

4. A device for facilitating the starting of a gasoline internal combustion motor of the type having its drive shaft extending vertically and having a starter drum fixedly mounted on the upper end portion of its drive shaft, said device comprising an elongated member rigid throughout its length having upper and lower end portions and an intermediate portion, all of said portions being fixed relative to each other, the lower end portion and the intermediate portion of said member being adapted to be fixedly secured to the side of such a motor in position so that the upper end portion of said member extends above the motor at a level opposite its starter drum, the upper end portion of said member being fixed relative to the motor when so secured and being of downwardly facing hook shape and having a generous radius and a smooth and concavely shaped line engaging surface adapted to engage a starter line connected to the starter drum when the line is passed thereunder to enable the starter to start the motor by pulling upwardly on the free end of the starter line.

References Cited in the file of this patent

UNITED STATES PATENTS

| 2,094,136 | Strawn | Sept. 28, 1937 |
| 2,568,822 | Pervis | Sept. 25, 1951 |